US006210808B1

(12) United States Patent
Naisby

(10) Patent No.: US 6,210,808 B1
(45) Date of Patent: Apr. 3, 2001

(54) INK JET RECORDING SHEET COMPRISING A CHROMOPHORE-GRAFTED POLYVINYL ALCOHOL

(75) Inventor: Andrew J. Naisby, Hampton, MA (US)

(73) Assignee: Rexam Graphics Inc., South Hadley, MA (US)

( * ) Notice: Subject to any disclaimer, the term of this patent is extended or adjusted under 35 U.S.C. 154(b) by 0 days.

(21) Appl. No.: 09/178,816

(22) Filed: Oct. 26, 1998

Related U.S. Application Data

(60) Provisional application No. 60/063,072, filed on Oct. 27, 1997, now abandoned.

(51) Int. Cl.[7] ..... B32B 27/30

(52) U.S. Cl. ..... 428/522; 428/195

(58) Field of Search ..... 428/195, 500, 428/528

(56) References Cited

U.S. PATENT DOCUMENTS

| | | | |
|---|---|---|---|
| 4,287,039 | 9/1981 | Beuthe et al. . | |
| 4,451,509 | 5/1984 | Frank et al. . | |
| 4,861,916 | 8/1989 | Kohler et al. . | |
| 5,045,573 | 9/1991 | Kohler et al. . | |
| 5,075,348 | 12/1991 | Revis et al. . | |
| 5,318,850 | 6/1994 | Pickett et al. . | |
| 5,565,302 | 10/1996 | Samukawa et al. . | |
| 5,565,501 | 10/1996 | Hosokawa et al. . | |
| 5,616,447 * | 4/1997 | Arioka | 430/270.11 |
| 5,616,450 * | 4/1997 | Arai et al. | 430/321 |
| 5,708,048 | 1/1998 | Medford et al. . | |
| 5,756,226 | 5/1998 | Valentini et al. . | |
| 5,759,727 | 6/1998 | Malhotra . | |
| 5,830,927 | 11/1998 | Vanderhoff et al. . | |
| 5,965,242 | 10/1999 | Patton et al. . | |
| 5,985,453 * | 11/1999 | Moriya et al. | 428/411.1 |

* cited by examiner

*Primary Examiner*—Bruce H. Hess
*Assistant Examiner*—Michael E. Grendzynski
(74) *Attorney, Agent, or Firm*—Burns, Doane, Swecker & Mathis, L.L.P.

(57) ABSTRACT

Provided is an ink jet recording medium comprised of an ink jet receptive layer on a substrate. The ink receptive layer is comprised of a water soluble polymer and a radiation cured, water insoluble monomer and/or prepolymer. When both the water soluble polymer and the water insoluble monomer and/or prepolymer are cured, a coating is created which has a cage structure with the radiation cured, water insoluble monomer and/or prepolymer existing as a micelle within a water soluble polymer matrix. The resulting ink jet medium exhibits excellent water resistance and extremely high gloss.

15 Claims, 1 Drawing Sheet

INK JET RECORDING SHEET COMPRISING A CHROMOPHORE-GRAFTED POLYVINYL ALCOHOL

RELATED APPLICATION

This application is based on U.S. provisional application Serial No. 60/063,072, filed on Oct. 27, 1997, abandoned.

FIELD OF THE INVENTION

The invention pertains to a novel ink-jet recording sheet exhibiting excellent water resistance and extremely high gloss. More particularly, the ink jet recording sheet comprises an ink receptive layer comprised of a radiation cured, water insoluble monomer and/or prepolymer, and water soluble polymer which is also preferably cured.

DESCRIPTION OF THE RELATED ART

Ink jet ink printers are known for their speed and convenience due to smaller size and accuracy. The ink used in such printers is generally water-based, often causing many problems for conventional ink jet media.

Aqueous inks affect the media on which they are printed, usually a form of coated paper, in many ways. The ink adheres by absorbing into the medium. The wetness of the ink often leads to bleeding of the image, smearing and lack of waterfastness, as well as other problems such as curl. Further problems associated with aqueous inks include lack of penetration into the medium, insufficient depth of color and rubbing off of the pigment or ink due to abrasion. Both the aqueous inks and the media on which they are printed have been examined in order to solve these various problems.

One solution has been to heat the ink, media or both to cause the ink to dry faster. However, there are still problems with smearing and, due to the heat and tackiness of the ink, the printed media will stick together when stacked. Therefore, this solution does not work for any sizeable printing jobs or with high speed printers. Further, this does not improve the waterfastness or gloss of the printed image, two very desirable properties.

Heretofore, there has been no suitable means of producing a waterfast, high gloss and high resolution aqueous ink jet ink printing system acceptable to the industry. It would be of great advantage to the industry if such a waterfast medium for use in printing with aqueous ink jet inks was available. Such a medium would be waterfast, exhibit high resolution and high gloss.

Accordingly, it is an objective of the present invention to provide an ink jet recording medium which exhibits excellent water fastness, as well as extremely high gloss.

Another objective of the present invention is to provide a novel ink jet recording medium which can be coated from an environmentally friendly aqueous medium.

Still another objective of the present invention is to employ a radiation curable material in the coating of an ink jet recording medium, without having to employ organic solvents, but rather an environmentally friendly system.

These and other objectives of the present invention will become obvious to the skilled artisan upon a review of the following description, the FIGURE of the Drawing and the claims appended hereto.

SUMMARY OF THE INVENTION

In accordance with the foregoing objectives, the present invention provides an ink jet recording medium which is waterfast, and provides a high resolution and glossy surface for printing. The ink jet recording medium comprises an ink receptive layer on a substrate, with the ink receptive layer being comprised of a water soluble polymer and a radiation cured, water insoluble monomer and/or prepolymer. Because the coating solution used to coat the ink receptive layer on the substrate is an aqueous mixture, there is no organic solvent to be removed. Further, the resulting ink jet recording sheet is waterfast, thereby preventing running and smearing of the ink during or after printing. This is important for normal printing of text and images, and vital for printing of photographic images. The coating further provides a glossy surface, ideal for photographic printing and desirable for printing, especially color printing, in general.

The ink receptive layer of the median is coated using an aqueous mixture which includes two phases, an aqueous phase and a non-aqueous phase. The non-aqueous phase includes a water insoluble monomer/pre-polymer together with a colloidal suspension of water insoluble particles, and the aqueous phase includes a water soluble polymer. The mixture remains stable over time and is easily coated by conventional means. Once coated, the water is removed and the solid coating subjected to radiation to cure the radiation curable, water insoluble monomer/prepolymer.

BRIEF DESCRIPTION OF THE DRAWING

The FIGURE of the Drawing schematically depicts the cage structure created when both the water soluble polymer and the water insoluble monomer and/or prepolymer are cured. The radiation cured, water insoluble monomer and/or prepolymer exists as micelles within a water soluble polymer matrix.

DETAILED DESCRIPTION OF THE PREFERRED EMBODIMENTS

Figure 1:
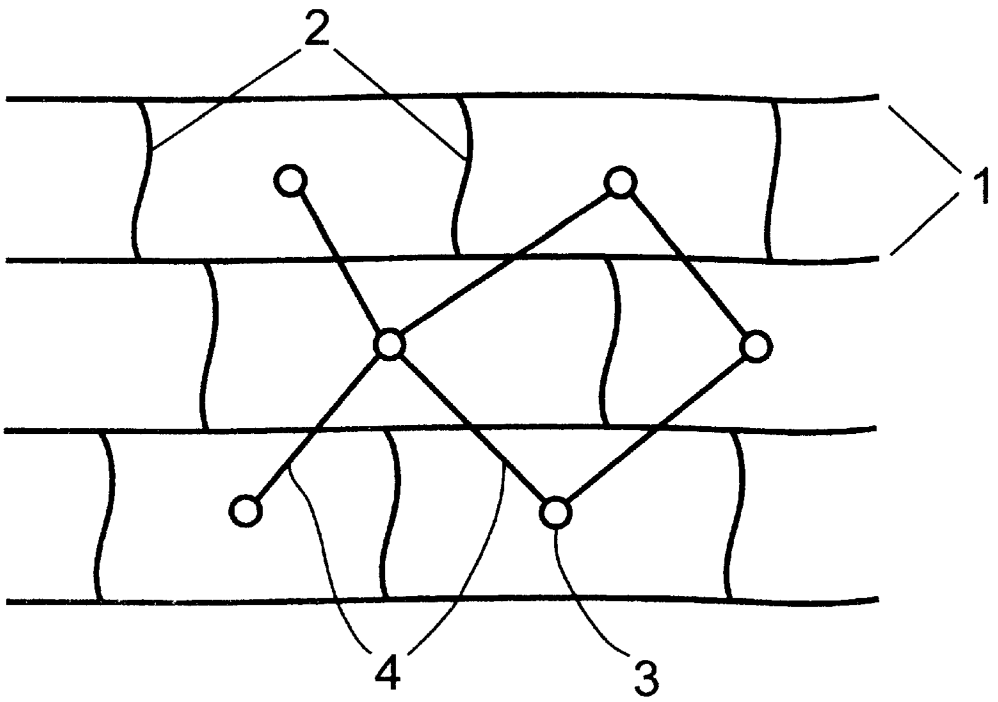

The invention provided herein is an ink jet recording medium useful for ink jet printing, particularly of color or photographic material. The printing of such material requires high resolution, high gloss and particularly waterfastness, because inks used in ink jet printing are primarily aqueous. The ink jet recording medium of the present invention comprises an ink receptive layer on a substrate. The substrate can be any conventional substrate used in ink jet printing media, such as paper. The ink receptive layer comprises a water soluble polymer and a radiation cured, water insoluble monomer and/or prepolymer. It is preferred that the water soluble polymer is also cured, which thereby creates a cage-like structure with the radiation cured, water insoluble monomer and/or prepolymer existing as micelles within a water soluble polymer matrix.

The cage-like structure can be schematically depicted as in the FIGURE of the Drawing. Therein, the water soluble polymer matrix is shown at 1. The water soluble polymer 1 is crosslinked 2 to create the cage-like structure. Within that structure are the radiation cured, water insoluble monomer/prepolymer micelles 3 which are also interconnected via curing 4. The resulting structure provides one with an ink jet medium which exhibits excellent water resistance and extremely high gloss. In fact, the high glossy surface would make such media ideal for photographic printing.

The coating solution used in preparing the ink jet recording medium of the present invention is aqueous based, containing a non-aqueous phase. The solution is coated onto a substrate, such as paper, coated or uncoated, a polymeric film, or a combination of the two. After coating the solution, the water is removed and the remaining solids coating is irradiated by ultraviolet light or electron bombardment, causing crosslinking of the water insoluble monomer/polymer within the structure of the water soluble polymer. This crosslinking of the water insoluble monomer/polymer creates micelles within the supporting lattice-work of the water soluble polymer, thereby rendering the coating extremely waterfast. Preferably, the water soluble polymer is also cured, either thermally during drying (removal of the water), or by U.V. radiation.

In preparing the ink jet medium, an aqueous phase is prepared by mixing one or more water soluble polymers with water. In particular, it is preferred that polyvinyl alcohol and/or a polyvinyl pyrrolidone be used. The following materials are exemplary of suitable water soluble polymers: polyvinyl pyrrolidone, co- and ter- polymers of polyvinyl pyrrolidone, polyvinyl alcohol (fully and partially hydrolyzed and/or anionically modified), polyacrylic acid and derivatives thereof, water soluble derivatives of cellulose, and the like. Other suitable materials will be apparent to those of skill in the art.

Materials found to be especially useful as the water soluble polymer are (poly)vinyl pyrrolidone/dimethylaminoethyl methacrylate copolymers. These materials are available from International Speciality Products under the trade names Copolymer 937 and Copolymer 845. These polymers are particularly useful in obtaining a rich gloss in the images produced.

If the water soluble polymer is to be ultimately cured, it is preferred that the water soluble polymer have one or more carboxyl, hydroxyl or amino moieties that can be thermally crosslinked. Generally, a thermal crosslinker such as an aziridine, oxazoline, water soluble epoxide and/or water soluble melamine resins is added to the aqueous coating solution.

If the water soluble polymer is to be cured using ultraviolet radiation, generally the addition of a photoinitiator or crosslinker to the aqueous mixture is preferred. Suitable examples of photoinitiators are known to those of skill in the art, such as alpha hydroxy ketones and phosphine oxides. Particularly useful in curing the aqueous phase by irradiation are grades of modified polyvinyl alcohols grafted with N-methyl-4-(p-formyl styryl) pyridinium methosulfate (S.B.Q.) chromophores. These chromophores undergo a crosslinking reaction when irradiated with ultraviolet radiation and are referred to as SBQ-PVA.

The waterfastness of the coating may also be improved by the addition or presence of primary, secondary or tertiary reactive or unreactive amines. These amines can be added to the coating solution. The amine may further be partially or completely neutralized with an organic or inorganic acid. Amines found to be particularly useful in the present invention are vinylamine-N-vinylformamide copolymer and acrylamine-N-vinylacrylamidine HCL- N-vinylacrylamide vinylamine-HCL- N-vinylformamide copolymer (referred to as PVAM and PVAD-L, respectively).

The coating solution is actually an aqueous mixture or emulsion, containing a colloidal suspension of a water insoluble particle. The particle is preferably polymeric, such as ethylene vinyl acetate, polyvinyl acetate, poly urethane, ethylene vinyl chloride, silicone and the like. Other suitable water insoluble particles such as macromolecular silicon dioxide (silica), however, can also be used. The aqueous emulsion also preferably contains a surfactant to stabilize the emulsion.

The aqueous emulsion containing the colloidal suspension of water insoluble particles is mixed sufficiently with a radiation curable, water insoluble monomer/prepolymer to create a stable mixture. A mixture of such monomer/prepolymers can be used. It is preferred that the monomers/prepolymers contain ethylenic unsaturated groups that can be polymerized and/or crosslinked by irradiation with electron bombardment or ultraviolet radiation in the presence of a photoinitiator system. The preferred monomers/prepolymers are urethane acrylates, carboxyethyl acrylates, trimethylol propane triacrylate and ethoxylated derivatives thereof, and acrylated amines, although other like materials will be obvious to those skilled in the art. In theory, it is believed that the mixture is stabilized by the normally unstable radiation curable monomer/prepolymer being adsorbed onto the colloidal suspended particles.

The water soluble polymer can be mixed in with the aqueous emulsion by means of a separate aqueous mixture, or can be mixed in as part of the original aqueous emulsion. The coating solution is then placed on a substrate, such as a paper substrate or polymeric substrate, cardboard, polymeric materials, fibers or other suitable printing media known in the art. The coating solution may be placed on the substrate by any method known in the art, such as by use of a Meyer bar, doctor blade, spin coating solution, dip coating solution, solution casting or the like. Once the coating solution is placed on the substrate, the aqueous solvent is evaporated thermally by heating to a suitable temperature. Generally, such temperature is from about 60 to about 160° C., more preferably from about 90 to about 140° C. If a thermal crosslinker is present, the drying step can also act to cure the water soluble polymer at this time. Once the water is removed, the coating can be cured.

Curing the coating by electron bombardment comprises subjecting the coating solution to a barage of electrons, as is known in the art. Alternatively, ultraviolet irradiation comprises subjecting the coating solution to ultraviolet light so as to cure the radiation curable, water insoluble monomer/prepolymer. If the water soluble polymer has not been previously cured thermally, it can also be cured by U.V. radiation in the presence of a photoinitiator.

The resulting coated substrate has a high gloss, is waterfast, and is suitable for printing with aqueous ink jet inks. In particular, printing of color or photographic images is envisioned in order to take advantage of the improved gloss and waterfastness.

The above-described invention will now be demonstrated in the following examples. The examples are meant to be illustrative only. Variations within the spirit and scope of the invention will be recognized by those of skill in the art and are intended to be covered herein.

EXAMPLES

The following materials were used in preparing the examples.

Aqueous Emulsions containing colloidal suspension:

- Airflex 110 Ethylene vinyl acetate copolymer emulsion (M.F.F.T. =0; Tg=+5° C.)
- Airflex 4530 Ethylene vinyl chloride copolymer emulsion (M.F.F.T. =30; Tg=30° C.)
- Both available from Air Products in Allentown, Pa.

Water Soluble Polymer:

- Gohsenol T-330H Anionic modified partially hydrolyzed polyvinyl alcohol. Available from Nippon Gohsei in Osaka, Japan.
- Airvol 325 Fully hydrolyzed polyvinyl alcohol. Available from Air Products in Allentown, Pa.

PVP K90 Poly(vinyl pyrrolidone). Available from I.S.P. Technologies in Wayne, N.J.

Copolymer 937 Poly(vinylpyrolidone/dimethylaminoethylmethacrylate) Available from I.S.P. Technologies in Wayne N.J.

SPP-S-10 SBQ-PVA (11.0% aqueous solution). Manufactured by Toyo Gosci, Japan. Available from Charkit Chemical Corporation in Darian, Conn.

PVAD-L Acrylamine-N-vinylacrylamidine HCL-N-vinylacrylamide vinylamine HCL-N-vinylformamide copolymer. Available from Esprit Chemical Company in Sarasota, Fla.

Thermal Crosslinking Agent:

Xama 7 Pentaerythritol-tris-(B-(aziridinyl)propionate) also known as a polyfunctional aziridine. Available from EIT Incorporated in Lake Wylie, S.C.

Radiation Curable, Monomer/Prepolymer (Ultraviolet/E.B. Cured):

B-CEA B-carboxyethyl acrylate.

Ebecryl P115 Acrylated tertiary amine.

Ebecryl 2001 Aliphatic urethane diacrylate.

TMPTA Trimethylolpropane triacrylate.

All available from U.C.B. Radcure in Smyrna, Ga.

Photoinitiators (Ultraviolet cured):

Darocur 1173 2-hydroxy-2-methyl-1-phenyl-propan-1-one, also known as an alpha hydroxy ketone.

Darocur 4265 A liquid blend of 50% Darocur 1173 and 50% 2,4,6-trimethylbenzoyl-diphenylphosphine oxide.

Irgacure 500 A eutectic mixture of 50% 1-hydroxycyclohexylphenyl ketone and 50% benzophenone. The 1-hydroxycyclohexylphenyl ketone is also known generically as an alphahydroxy ketone.

All available from Ciba Additives in Hawthorne, N.Y.

Example 1

Pre-mix A: All of the following ingredients in the indicated weight percentages, except Airflex 110, are weighed and stirred together. The mixed ingredients are then added to the pre-weighed Airflex 110, and stored.

| | |
|---|---|
| Airflex 110 | 75.0 |
| B-CEA | 5.0 |
| Ebecryl P115 | 5.0 |
| Ebecryl 2001 | 14.0 |
| Darocur 1173 | 1.0 |

Pre-mix B: Gohsenol T-330H in the amount listed below is added to water in the amount listed below. The temperature of this slurry is raised to 150° F. and stirred until complete dissolution is obtained. The solution is allowed to cool to room temperature and then the PVP K90 is stirred in until it is also in solution. The Xama7 is the final ingredient to be stirred into the pre-mix.

| | |
|---|---|
| Gohsenol T-330H | 6.0 |
| PVP K90 | 6.0 |
| Xama 7 | 0.3 |
| Water | 87.7 |

Final mix —The two pre-mixes A and B (5 parts by wt. of pre-mix A; 95 parts by wt. of pre-mix B) are stirred together to form a stable mixture.

| | |
|---|---|
| pre-mix A | 5.0 |
| pre-mix B | 95.0 |

The coating solution formed above is cast onto a support substrate of polythene coated paper using a Meyer bar. All the water is evaporated in a standard convection oven (240° F. for 6 minutes) to form a robust film. The coating solution is then exposed to Ultraviolet radiation (1000 milliJoules/cm$^2$) to effect curing of the water soluble polymer and the water insoluble monomer/prepolymer. The sample is then ready for printing.

A sample is printed on an Encad Novapro printer with a full color test pattern. The print is allowed to dry in ambient conditions for 1 hour after which it is totally immersed in water for 10 minutes. The change in color density of the colors is recorded and the amount of wet abrasion resistance is ascertained. The results are shown in Table 1 below.

Example 2

The mix preparation, coating solution preparation and testing is performed in exactly the same way as in Example 1, except the polyvinyl alcohol (SBQ-PVA as opposed to Gohsenol T-330H) is obtained as an 11% solution. Therefore, the heating stage to dissolve the water soluble polymer is unnecessary.

| | | |
|---|---|---|
| Pre-mix A: | Airflex 110 | 75.0 |
| | B-CEA | 5.0 |
| | Ebecryl P115 | 5.0 |
| | Ebecryl 2001 | 14.0 |
| | Darocur 1173 | 1.0 |
| Pre-mix B: | SPP-S-10 | 54.55 |
| | PVP K90 | 6.0 |
| | Water | 33.45 |
| Final mix: | pre-mix A | 5.0 |
| | pre-mix B | 95.0 |

Example 3

The mix preparation, coating solution preparation and testing is performed as in Example 1.

| | | |
|---|---|---|
| Pre-mix A: | Airflex 4530 | 75.0 |
| | B-CEA | 10.0 |
| | Ebecryl 2001 | 13.5 |
| | TMPTA | 0.5 |
| | Darocur 1173 | 1.0 |
| Pre-mix B: | Gohsenol T-330H | 6.0 |
| | PVP K90 | 6.0 |
| | PVAD-L | 0.5 |
| | Xama 7 | 0.3 |
| | Water | 87.2 |
| Final mix: | pre-mix A | 5.0 |
| | pre-mix B | 95.0 |

Example 4

The mix preparation, coating solution preparation and testing is performed in exactly the same way as Example 1, except the polyvinyl pyrrolidone copolymer is obtained in solution (copolymer 937).

| | | |
|---|---|---|
| Pre-mix A: | Airflex 4530 | 75.0 |
| | B-CEA | 10.0 |
| | Ebecryl 200 | 13.5 |
| | TMPTA | 0.5 |
| | Darocur 1173 | 1.0 |
| Pre-mix B: | Gohsenol T-330H | 6.0 |
| | Copolymer 937 | 30.0 |
| | PVAD-L | 0.5 |
| | Xama 7 | 0.3 |
| | Water | 57.2 |
| Final mix: | pre-mix A | 5.0 |
| | pre-mix B | 95.0 |

Example 5

The mix preparation, coating solution preparation and testing is performed in exactly the same way as Example 1, except the polyvinyl alcohol grade has changed from Gohsenol T-330H to Airvol 325.

| | | |
|---|---|---|
| Pre-mix A: | Airflex 4530 | 75.0 |
| | B-CEA | 10.0 |
| | Ebecryl 2001 | 13.5 |
| | TMPTA | 0.5 |
| | Darocur 1173 | 1.0 |
| Pre-mix B: | Airvol 325 | 6.0 |
| | PVP K90 | 6.0 |
| | PVAD-L | 0.5 |
| | Water | 87.5 |
| Final mix: | pre-mix A | 5.0 |
| | pre-mix B | 95.0 |

Example 6

The mix preparation, coating solution preparation and testing is performed in exactly the same way as Example 1, except the polyvinyl alcohol grade has changed from Gohsenol T-330H to Airvol 325.

| | | |
|---|---|---|
| Pre-mix A: | Airflex 4530 | 75.0 |
| | B-CEA | 10.0 |
| | Ebecryl 2001 | 13.5 |
| | TMPTA | 0.5 |
| | Irgacure 500 | 1.0 |
| Pre-mix B: | Airvol 325 | 6.0 |
| | PVP K90 | 6.0 |
| | PVAD-L | 0.5 |
| | Water | 87.5 |
| Final mix: | pre-mix A | 5.0 |
| | pre-mix B | 95.0 |

Comparative Example

A mix was attempted using the same mix procedure as Example 1 but leaving out the colloidal suspension of water insoluble particles. Without the colloidal suspension of particles, the final mix coagulated and the preparation of a coating solution was impossible.

| | | |
|---|---|---|
| Pre-mix A: | B-CEA | 10.0 |
| | Ebecryl 2001 | 13.5 |
| | TMPTA | 0.5 |
| | Darocur 1173 | 1.0 |
| Pre-mix B: | Airvol 325 | 6.0 |
| | PVP K90 | 6.0 |
| | PVAD-L | 0.5 |
| | Water | 87.5 |
| Final mix: | pre-mix A | 5.0 |
| | pre-mix B | 95.0 |

TABLE 1

| | Print Quality | Wet Rub | Wet/Dry Rub | Bleed During Immersion | Gloss * |
|---|---|---|---|---|---|
| Example 1 | Very Good | Good | Good | No ink seen in water | 85 |
| Example 2 | Very Good | Good | Good | No ink seen in water | 89 |
| Example 3 | Very Good | Good | Good | No ink seen in water | 82 |
| Example 4 | Very Good | Good | Good | No ink seen in water | 90 |
| Example 5 | Very Good | Good | Good | Some ink seen in water | 85 |
| Example 6 | Very Good | Good | Good | No ink seen in water | 86 |

*Gloss measured using Sheen glossmeter with a 60 degree angle.

The above results indicate that in Example 1, the ultraviolet curable monomer mixture has been successfully stabilized by ethylene vinyl acetate emulsion premix A, allowing it to be incorporated into premix B, the aqueous phase, which is also thermally crosslinkable. This produces a coating solution which provides both high gloss and a waterfast image from two incompatible phases (see, for example, the comparative example where failure to use the colloidal suspension of water insoluble particles resulted in an inability to provide a uniform coating).

Example 2 illustrates the use of a ultraviolet curable non-aqueous phase (pre-mix A) and a Ultraviolet curable aqueous phase (pre-mix B). The material SPP-10 is a Ultraviolet crosslinkable water soluble polymer.

Example 3 illustrates the same mechanism as Example 1 but uses Airflex 4530 as the colloidal suspension. This example also illustrates the use of a partially neutralized amine (PVAD-L) which is useful in increasing the waterfastness of the printed image.

Example 4 illustrates the same mechanism as Examples 1 and 3 using Copolymer 937 in the aqueous phase. This polymer is thermally crosslinkable with Xama 7, and its use increases the gloss of the coating solution further.

Example 5 does not have a crosslinkable or curable water soluble polymer (premix B ). The imaged coating solution yields high gloss but some ink is lost when the print is immersed in water. The remaining properties are similar to those of Examples 1 and 3. Thus, use of a curable, water soluble polymer is most preferred.

Example 6 shows that improvements with respect to waterfastness of the image can be attained by adding the partially neutralized amine, PVAD-L, to premix B. Otherwise, Example 6 is identical to Example 5 and the water soluble polymer is not crosslinked or cured.

The comparative example demonstrates that without the effect of a colloidal suspension, the formation of an homogeneous mixture is impossible.

Example 7

The advantage of incorporation a U.V. curable water insoluble phase into an aqueous emulsion containing a water soluble polymer to make an ink-jet receptive coating with enhanced properties is demonstrated by this example.

Two coatings are formed according to Example 1 using only Pre-mix B in one instance (7A), and the Final Mix in the second (7B), i.e., that is with and without U.V. curable materials in the final coating.

A sample is printed on the Encad Novapro. A full color test pattern was printed with Encad GS inks.

The print is allowed to dry in ambient conditions for 1 hour after which it is totally immersed in water for 10 minutes. The effect on the printed image and coating is recorded. The abrasion resistance of the coating is tested on the samples that had been immersed in water.

Results

| | 7A | 7B |
|---|---|---|
| Color bleed during water immersion. | Excessive bleed in all colors. | Small cyan and black bleed only. |
| Wet abrasion resistance. | Coating easily removed after 1 rub. | Coating removed after 75 rubs. |

The gloss of the coating is measured by a Sheen glossmeter with a 60 degree angle prior to printing and water testing:

| | 7A | 7B |
|---|---|---|
| Gloss | 78–80% | 88–90% |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An ink jet recording medium comprised of an ink receptive layer on a substrate, with the ink receptive layer being comprised of a water soluble polymer which is a modified polyvinyl alcohol grafted with N-methyl-4-(p-formyl styryl) pyridinium metholsulfate chromophores, and a radiation cured, water insoluble monomer and/or prepolymer.

2. The ink jet medium of claim 1, wherein the water soluble polymer is also cured.

3. The ink jet medium of claim 2, wherein the water soluble polymer is cured by the UV radiation.

4. The ink jet medium of claim 3, wherein the radiation cured water insoluble monomers and/or prepolymers are also cured by UV radiation.

5. The ink jet medium of claim 2, wherein the water soluble polymer is thermally cured.

6. The ink jet medium of claim 5, wherein the water soluble polymer is thermally cured during a drying stage.

7. The ink jet medium of claim 1, wherein the water insoluble monomers and/or prepolymers are radiation cured by UV radiation.

8. The ink jet medium of claim 1, wherein the radiation cured water insoluble monomers and/or prepolymers are cured by electron bombardment.

9. The ink jet medium of claim 1, wherein the ink receptive layer further comprises a photoinitiator.

10. The ink jet medium of claim 1, wherein the ink receptive layer further comprises a thermal crosslinker.

11. The ink jet medium of claim 1, wherein the radiation cured water insoluble monomers and/or prepolymers contain ethylenic unsaturated groups.

12. The ink jet medium of claim 1, wherein the radiation cured, water insoluble monomers and/or prepolymers comprise an urethane acrylate, carboxyethyl acrylate, trimethylol propane triacrylate and ethoxylated derivative there, or an acrylated amine, or a mixture thereof.

13. The ink jet medium of claim 1, wherein the ink receptive layer further comprises a water insoluble material different from that of the water insoluble, radiation cured monomer and/or prepolymer.

14. The ink jet medium of claim 13, wherein the ink receptive layer further comprises a water insoluble polymer selected from the group consisting of ethylene vinyl acetate, polyvinyl acetate, poly urethane, ethylene vinyl chloride and silicone.

15. The ink jet medium of claim 1, wherein the water soluble polymer and the radiation cured water insoluble monomer and/or prepolymer are both cured, and exist in a cage structure with the radiation cured, water insoluble monomer and/or prepolymer existing as a micelle within a water soluble polymer matrix.

* * * * *